United States Patent [19]
Gifford

[11] Patent Number: 5,812,776
[45] Date of Patent: Sep. 22, 1998

[54] METHOD OF PROVIDING INTERNET PAGES BY MAPPING TELEPHONE NUMBER PROVIDED BY CLIENT TO URL AND RETURNING THE SAME IN A REDIRECT COMMAND BY SERVER

[75] Inventor: David K. Gifford, Weston, Mass.

[73] Assignee: Open Market, Inc., Burlington, Mass.

[21] Appl. No.: 486,797

[22] Filed: Jun. 7, 1995

[51] Int. Cl.[6] .............................. G06F 15/16; G06F 15/82
[52] U.S. Cl. ................................ 395/200.47; 395/200.33; 395/200.48; 395/200.49
[58] Field of Search ...................................... 395/200, 600, 395/157, 200.01, 200.15, 200.47, 200.48, 200.49, 200.33; 364/280, 286; 370/392, 401, 405

[56] References Cited

U.S. PATENT DOCUMENTS

| | | | |
|---|---|---|---|
| 4,941,089 | 7/1990 | Fischer | 395/200.01 |
| 5,204,947 | 4/1993 | Bernstein et al. | 395/157 |
| 5,297,249 | 3/1994 | Bernstein et al. | 395/156 |
| 5,309,437 | 5/1994 | Perlman et al. | 370/401 |
| 5,325,362 | 6/1994 | Aziz | 370/405 |
| 5,353,283 | 10/1994 | Tsuchiya | 370/392 |
| 5,483,652 | 1/1996 | Sudama et al. | 395/600 |
| 5,491,820 | 2/1996 | Belove et al. | 395/600 |
| 5,530,852 | 6/1996 | Meske, Jr. et al. | 395/600 |
| 5,544,320 | 8/1996 | Konrad | 395/200.09 |
| 5,577,209 | 11/1996 | Boyle et al. | 395/200.06 |
| 5,583,996 | 12/1996 | Tsuchiya | 395/200.15 |

FOREIGN PATENT DOCUMENTS

| | | |
|---|---|---|
| 0 456 920 | 11/1991 | European Pat. Off. . |
| WO 94/03859 | 2/1994 | WIPO .............................. G06F 13/14 |
| WO 94/03959 | 2/1994 | WIPO . |
| 0 645 688 | 3/1995 | WIPO . |

OTHER PUBLICATIONS

Ramanathan, Srinivas, et al., "Architectures for Personalized Multimedia," IEEE Multimedia, vol. 1, No. 1, Computer Society, pp. 37–46, 1994.

Choudhury, Abhijit K., et al., "Copyright Protection for Electronic Publishing Over Computer Networks," IEEE Network, The Magazine of Computer Communications, vol. 9, No. 3, pp. 12–20, May 1995.

"maX.500—a Macintosh X.500 Directory Client", contents of WWW Web Site http://www.umich.edu/~rsug/ldap/max500/ as of Jul. 7, 1997, Sep. 6, 1995.

"Directory Server 1.0 for Windows NT and Unix", contents of WWW Web Site, http://www.merchant.netscape.com/netstore/servers/directory.html as of Jul. 7, 1997.

"X.500 Implementation Description Page", Contents of WWW Web Site, http://www.internic.net/projects/x500catalog/impdescrs/hpdistdir.html as of Jul. 7, 1997, Aug. 16, 1993.

"New host for internet commercial site index", Menefee, Craig, Newsbytes, Nov. 9, 1994, p. 15.

"Content in context: the future of SGML and HTML", Michalski, Jerry, Release 1.0, Sep. 27, 1994, EDventure Holdings Inc., V94, n9, p. 13.

(List continued on next page.)

*Primary Examiner*—Thomas C. Lee
*Assistant Examiner*—Ki S. Kim
*Attorney, Agent, or Firm*—Hamilton, Brook, Smith & Reynolds, P.C.

[57] ABSTRACT

This invention relates to methods for providing access to network servers. In particular, the process described in the invention includes client-server sessions over the Internet involving hypertext files. In the hypertext environment, a client views a document transmitted by a content server with a standard program known as the browser. Each hypertext document or page contains links to other hypertext pages which the user may select to traverse. The user may also access a hypertext page by providing a conventional telephone number or other descriptor. The server maps such a telephone number or descriptor to a target page identifier using a translation database and automatically directs the client to retrieve the desired page.

2 Claims, 7 Drawing Sheets

OTHER PUBLICATIONS

"SuperHighway Acess eases Internet entry", Phillips, Ken, PC Week,V11, n43, Siff–Davis publishing Co., p. 3, Oct. 31, 1994.

"Wide area information servers", Buhle, Digital Systems Journal, Professional Press Inc., V16, n5, p. 13, Oct. 1994.

"Commercialization of the Internet opens gateway to Interpreneurs", Metcalfe, InfoWorld, InfoWorld publishing Co., v16, n32, p. 44, Aug. 8, 1994.

Netscape Products, "Open and Secure Internet Software" Internet, Sep. 18, 1995, pp. 1–2.

Merchant System: Overview, "Netscape Merchant System Data Sheet" Internet, Sep. 18, 1995, pp. 1–3.

Intenet Applications Customer Showcase, "Customer Showcase" Internet, Sep. 18, 1995., pp. 1–2.

The Server–Application Function and Netscape Server API, "The Netscape Server API" Netscape Products Internet, Sep. 18, 1995, pp. 1–11.

The Object–Oriented Paradigm of Server Configuration, "The Object–Oriented Pradigm of Server Configuration" Internet, Sep. 18, 1995, p. 102.

Verisign Redirection Information, "Important Announcement" Internet, Sep. 18, 1995, p. 1.

Lou Montulli, Electronic Mail to multiple recipients of the www–talk list (www–talk@www10.w3.org) on "Session Tracking" (omi.mail.www–talk, Apr. 18, 1995).

PR: Digital IDs for Open Market's Secure WebServer, "Press Release, VeriSign, Inc. to Provide Digital IDs for Open Market's Secure WebServer" Internet, Sep. 18, 1995, pp. 1–2.

PR: Online Security Solutions, "VeriSign, Inc. Adds the Missing Component to Online Security Solutions" Internet, Sep. 18, 1995, pp. 1–2.

The SSL Protocol, Internet, Sep. 18, 1995, pp. 1–18.

IStore, "Netscape Istore Data Sheet" Internet, Sep. 18, 1995, pp. 1–2.

Peterson, Larry L., "A Yellow–Pages Service for a Local–Area Network", ACM Proceedingsof the ACM SIGCOMM 87 Workshop, ACM Press, 1988, pp. 235–242.

Document View

*File  Options  Navigate  Annotate  Documents*                    *Help*

Title: | How to join |
URL:   | http://auth.com/service/nph-createacct.cgi |

1. First name  [            ]

2. Last name   [            ]

3. Choose a screen name (no more than 15 characters)
   [            ]

4. Choose a password (no more than 15 characters)

Password:
   [        ]

Re-enter password:
   [        ]

5. E-mail address
   [                                    ]

6. Your birthdate (MM/DD/YY  [            ]

7. U.S. zip code, or country code
   Zip/postal code:
   [            ]

ISO country code
   [US          ]

FIG. 5

METHOD OF PROVIDING INTERNET PAGES BY MAPPING TELEPHONE NUMBER PROVIDED BY CLIENT TO URL AND RETURNING THE SAME IN A REDIRECT COMMAND BY SERVER

BACKGROUND OF THE INVENTION

The Internet, which started in the late 1960s, is a vast computer network consisting of many smaller networks that span the entire globe. The Internet has grown exponentially, and millions of users ranging from individuals to corporations now use permanent and dial-up connections to use the Internet on a daily basis worldwide. The computers or networks of computers connected within the Internet, known as "hosts", allow public access to databases featuring information in nearly every field of expertise and are supported by entities ranging from universities and government to many commercial organizations.

The information on the Internet is made available to the public through "servers". A server is a system running on an Internet host for making available files or documents contained within that host. Such files are typically stored on magnetic storage devices, such as tape drives or fixed disks, local to the host. An Internet server may distribute information to any computer that requests the files on a host. The computer making such a request is known as the "client", which may be an Internet-connected workstation, bulletin board system or home personal computer (PC).

TCP/IP (Transmission Control Protocol/Internet Protocol) is one networking protocol that permits full use of the Internet. All computers on a TCP/IP network need unique ID codes. Therefore, each computer or host on the Internet is identified by a unique number code, known as the IP (Internet Protocol) number or address, and corresponding network and computer names. In the past, an Internet user gained access to its resources only by identifying the host computer and a path through directories within the host's storage to locate a requested file. Although various navigating tools have helped users to search resources on the Internet without knowing specific host addresses, these tools still require a substantial technical knowledge of the Internet.

The World-Wide Web (Web) is a method of accessing information on the Internet which allows a user to navigate the Internet resources intuitively, without IP addresses or other technical knowledge. The Web dispenses with command-line utilities which typically require a user to transmit sets of commands to communicate with an Internet server. Instead, the Web is made up of hundreds of thousands of interconnected "pages", or documents, which can be displayed on a computer monitor. The Web pages are provided by hosts running special servers. Software which runs these Web servers is relatively simple and is available on a wide range of computer platforms including PC's. Equally available is a form of client software, known as a Web "browser", which is used to display Web pages as well as traditional non-Web files on the client system. Today, the Internet hosts which provide Web servers are increasing at a rate of more than 300 per month, en route to becoming the preferred method of Internet communication.

Created in 1991, the Web is based on the concept of "hypertext" and a transfer method known as "HTTP" (Hypertext Transfer Protocol). HTTP is designed to run primarily over TCP/IP and uses the standard Internet setup, where a server issues the data and a client displays or processes it. One format for information transfer is to create documents using Hypertext Markup Language (HTML). HTML pages are made up of standard text as well as formatting codes which indicate how the page should be displayed. The Web client, a browser, reads these codes in order to display the page. The hypertext conventions and related functions of the world wide web are described in the appendices of U.S. patent application Ser. No. 08/328,133, filed on Oct. 24, 1994, by Payne et al. which is incorporated herein by reference.

Each Web page may contain pictures and sounds in addition to text. Hidden behind certain text, pictures or sounds are connections, known as "hypertext links" ("links"), to other pages within the same server or even on other computers within the Internet. For example, links may be visually displayed as words or phrases that may be underlined or displayed in a second color. Each link is directed to a web page by using a special name called a URL (Uniform Resource Locator). URLs enable a Web browser to go directly to any file held on any Web server. A user may also specify a known URL by writing it directly into the command line on a Web page to jump to another Web page.

The URL naming system consists of three parts: the transfer format, the host name of the machine that holds the file, and the path to the file. An example of a URL may be:

http://www.college.univ.edu/Adir/Bdir/Cdir/page.html, where "http" represents the transfer protocol; a colon and two forward slashes (://) are used to separate the transfer format from the host name; "www.college.univ.edu" is the host name in which "www" denotes that the file being requested is a Web page;"/Adir/Bdir/Cdir" is a set of directory names in a tree structure, or a path, on the host machine; and "page.html" is the file name with an indication that the file written in HTML.

The Internet maintains an open structure in which exchanges of information are made cost-free without restriction. The free access format inherent to the Internet, however, presents difficulties for those information providers requiring control over their Internet servers. Consider for example, a research organization that may want to make certain technical information available on its Internet server to a large group of colleagues around the globe, but the information must be kept confidential. Without means for identifying each client, the organization would not be able to provide information on the network on a confidential or preferential basis. In another situation, a company may want to provide highly specific service tips over its Internet server only to customers having service contracts or accounts.

Access control by an Internet server is difficult for at least two reasons. First, when a client sends a request for a file on a remote Internet server, that message is routed or relayed by a web of computers connected through the Internet until it reaches its destination host. The client does not necessarily know how its message reaches the server. At the same time, the server makes responses without ever knowing exactly who the client is or what its IP address is. While the server may be programmed to trace its clients, the task of tracing is often difficult, if not impossible. Secondly, to prevent unwanted intrusion into private local area networks (LAN), system administrators implement various data-flow control mechanisms, such as the Internet "firewalls", within their networks. An Internet firewall allows a user to reach the Internet anonymously while preventing intruders of the outside world from accessing the user's LAN.

SUMMARY OF THE INVENTION

While traversing links in Web pages facilitates access to Internet documents, the user may gain access to Web pages by directly inputting URLs. Unfortunately, it can be difficult for end users to directly access Internet facilities because they must remember complex and unfamiliar URLs. These URLs must be provided in a specific syntax which will be difficult for many users to understand.

The present invention relates to methods of processing service requests from a client to a server through a network. In particular, the present invention is applicable to processing client requests in an HTTP (Hypertext Transfer Protocol) environment, such as the Worldwide Web (Web). In one aspect of the invention, the client requests information pages by using a nonURL descriptor to identify a page which contains the information. Such a descriptor is mapped to a target page identifier using a translation data base. In a preferred embodiment the target page identifier is a uniform resource locator. A request is then made to the server system to retrieve information described by the page identifier, and the page identified by the identifier is then displayed at the client.

In one embodiment, the descriptor may be a telephone number. In another embodiment, the descriptor may be a descriptive term which may include a company name or product name. In a preferred embodiment, a descriptive term may be mapped to a page by phonetic mapping such that the user may enter a company name or product name to initiate a request without knowing the exact spelling of such a descriptive term. Using the methods described in the present invention, the user may request information contained in a controlled page as well as those in a non-controlled page.

BRIEF DESCRIPTION OF THE DRAWINGS

FIG. 5 is an example of an authorization form page.

DETAILED DESCRIPTION OF THE INVENTION

Figure 1:
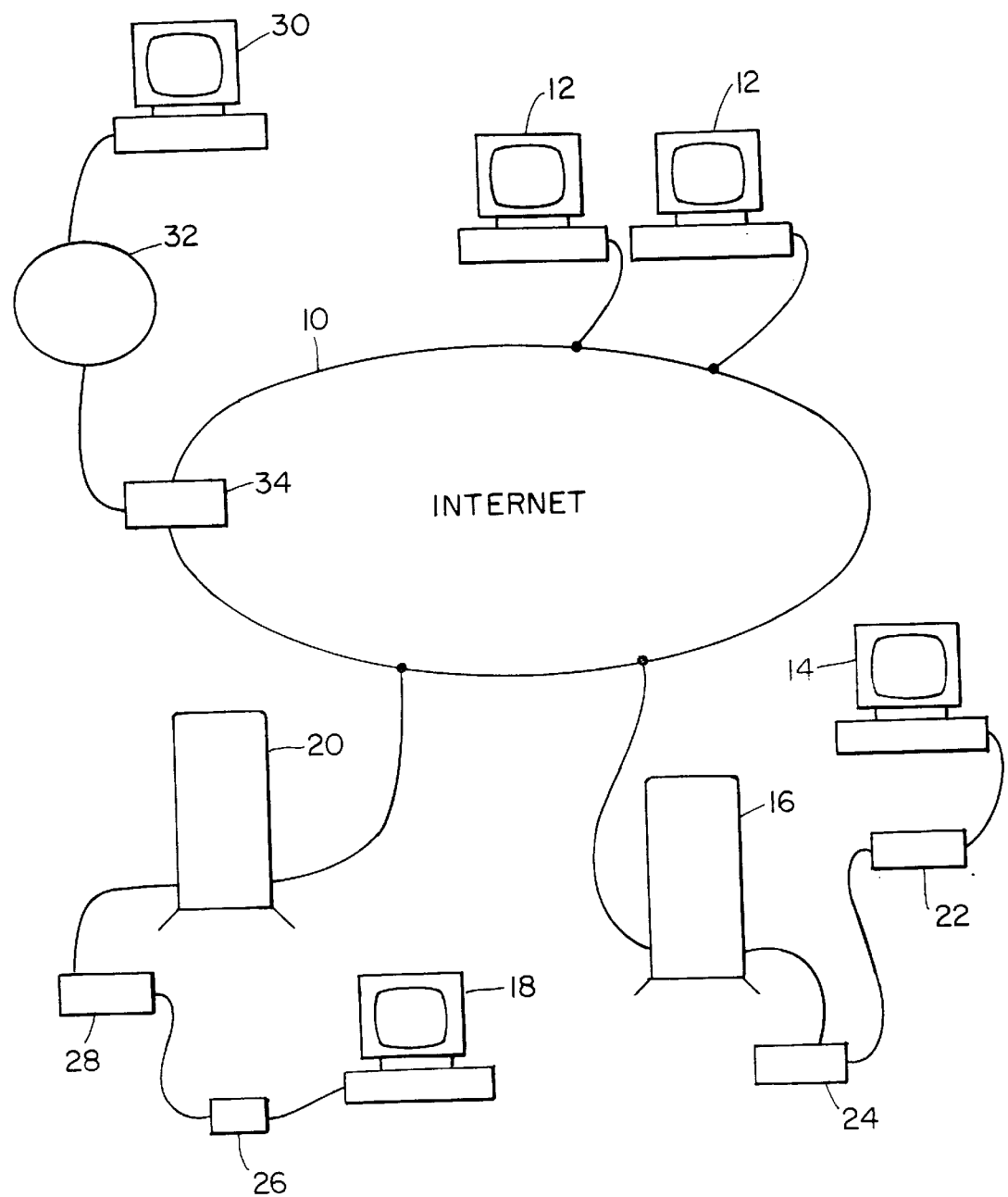
FIG. 1 is a diagram illustrating the Internet operation.

Referring now to the drawings, FIG. 1 is a graphical illustration of the Internet. The Internet 10 is a network of millions of interconnected computers 12 including systems owned by Internet providers 16 and information systems (BBS) 20 such as Compuserve or America Online. Individual or corporate users may establish connections to the Internet in several ways. A user on a home PC 14 may purchase an account through the Internet provider 16. Using a modem 22, the PC user can dial up the Internet provider to connect to a high speed modem 24 which, in turn, provides a full service connection to the Internet. A user 18 may also make a somewhat limited connection to the Internet through a BBS 20 that provides an Internet gateway connection to its customers.

Figure 2A:
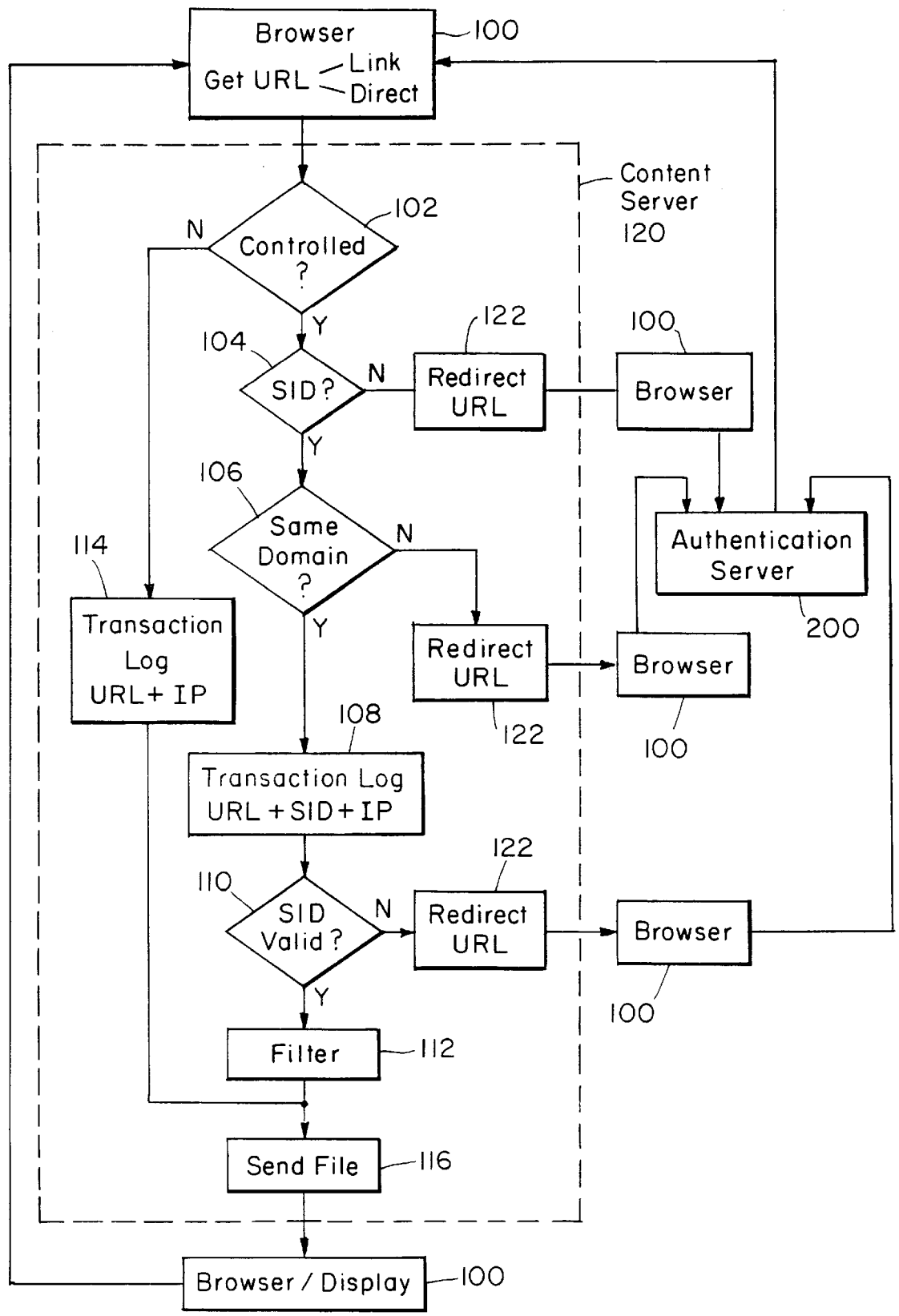
FIG. 2A is a flowchart describing the preferred method of Internet server access control and monitoring.
Figure 4:
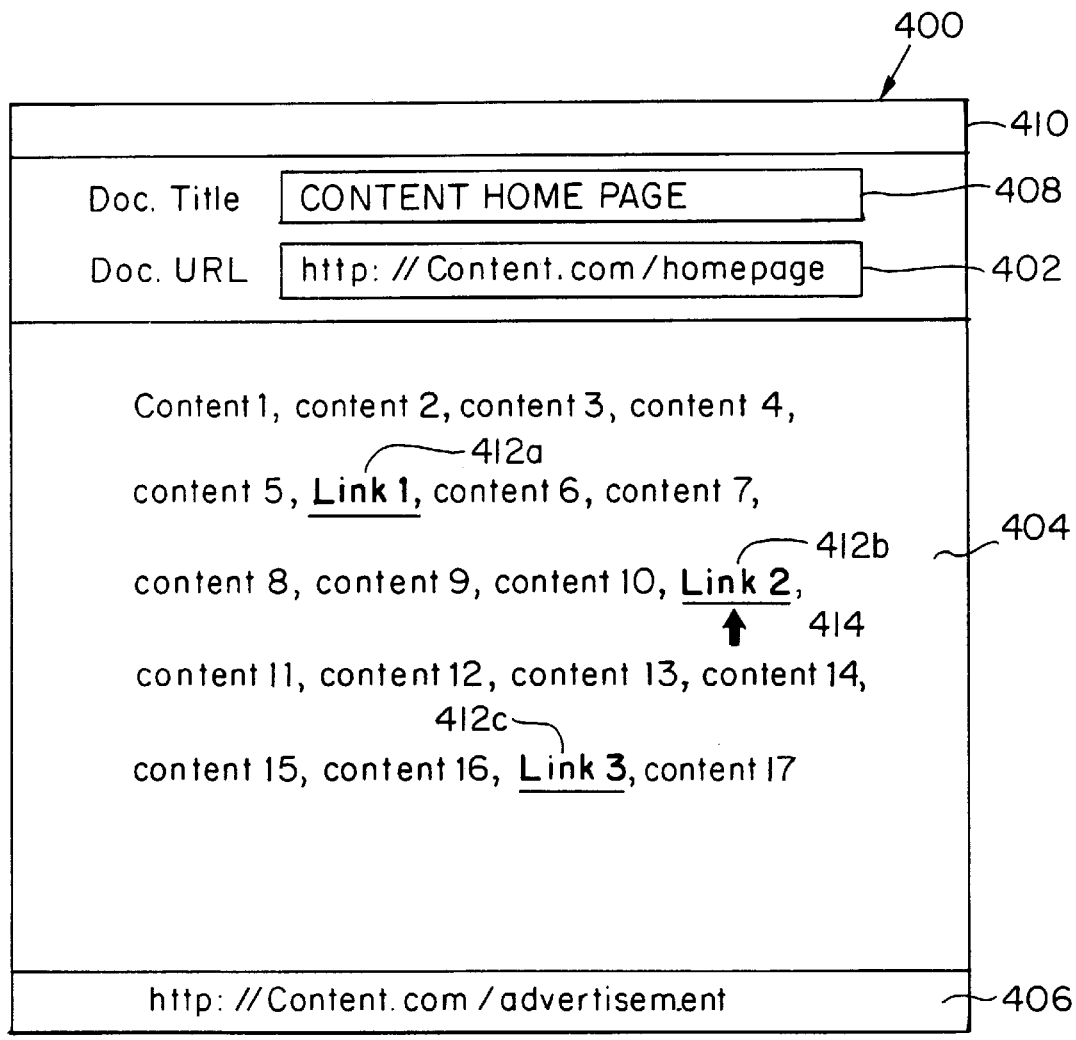
FIG. 4 is an example of a World Wide Web page.

FIG. 2A is a flowchart detailing the preferred process of the present invention and FIG. 4 illustrates a sample Web page displayed at a client by a browser. The page includes text 404 which includes underlined link text 412. The title bar 408 and URL bar 402 display the title and URL of the current web page, respectively. As shown in FIG. 4, the title of the page is "Content Home Page" and the corresponding URL is "http://content.com/homepage". When a cursor 414 is positioned over link text 412b, the page which would be retrieved by clicking a mouse is typically identified in a status bar 406 which shows the URL for that link. In this example the status bar 406 shows that the URL for the pointed link 412b is directed to a page called "advertisement" in a commercial content server called "content". By clicking on the link text, the user causes the browser to generate a URL GET request at 100 in FIG. 2A. The browser forwards the request to a content server 120, which processes the request by first determining whether the requested page is a controlled document 102. If the request is directed to an uncontrolled page, as in "advertisement" page in this example, the content server records the URL and the IP address, to the extent it is available, in the transaction log 114. The content server then sends the requested page to the browser 116 for display on the user computer 117.

If the request is directed to a controlled page, the content server determines whether the URL contains an SID 102. For example, a URL may be directed to a controlled page name "report", such as "http://content.com/report", that requires an SID. If no SID is present, as in this example, the content server sends a "REDIRECT" response 122 to the browser 100 to redirect the user's initial request to an authentication server 200 to obtain a valid SID. The details of the authentication process are described in FIG. 2B and will be discussed later, but the result of the process is an SID provided from the authentication server to the client. In the above example, a modified URL appended with an SID may be: "http://content.com/[SID]/report". The preferred SID is a sixteen character ASCII string that encodes 96 bits of SID data, 6 bits per character. It contains a 32-bit digital signature, a 16-bit expiration date with a granularity of one hour, a 2-bit key identifier used for key management, an 8-bit domain comprising a set of information files to which the current SID authorizes access, and a 22-bit user identifier. The remaining bits are reserved for expansion. The digital signature is a cryptographic hash of the remaining items in the SID and the authorized IP address which are encrypted with a secret key which is shared by the authentication and content servers.

If the initial GET URL contains a SID, the content server determines whether the request is directed to a page within the current domain 106. If the request having a SID is directed to a controlled page of a different domain, the SID is no longer valid and, again, the user is redirected to the authentication server 122.

If the request is for a controlled page within the current domain, the content server proceeds to log the request URL, tagged with SID, and the user IP address in the transaction log 108. The content server then validates the SID 110. Such validation includes the following list of checks: (1) the SID's digital signature is compared against the digital signature computed from the remaining items in the SID and the user IP address using the secret key shared by the authentication and content servers; (2) the domain field of the SID is checked to verify that it is within the domain authorized; and (3) the EXP field of the SID is checked to verify that it is later than the current time.

If the validation passes, the content server searches the page to be forwarded for any absolute URL links contained therein 112, that is, any links directed to controlled documents in different content servers. The content server augments each absolute URL with the current SID to facilitate authenticated accesses across multiple content servers. The requested page as processed is then transmitted to the client browser for display 117. The user viewing the requested Web page may elect to traverse any link on that page to trigger the entire sequence again 100.

Figure 2B:
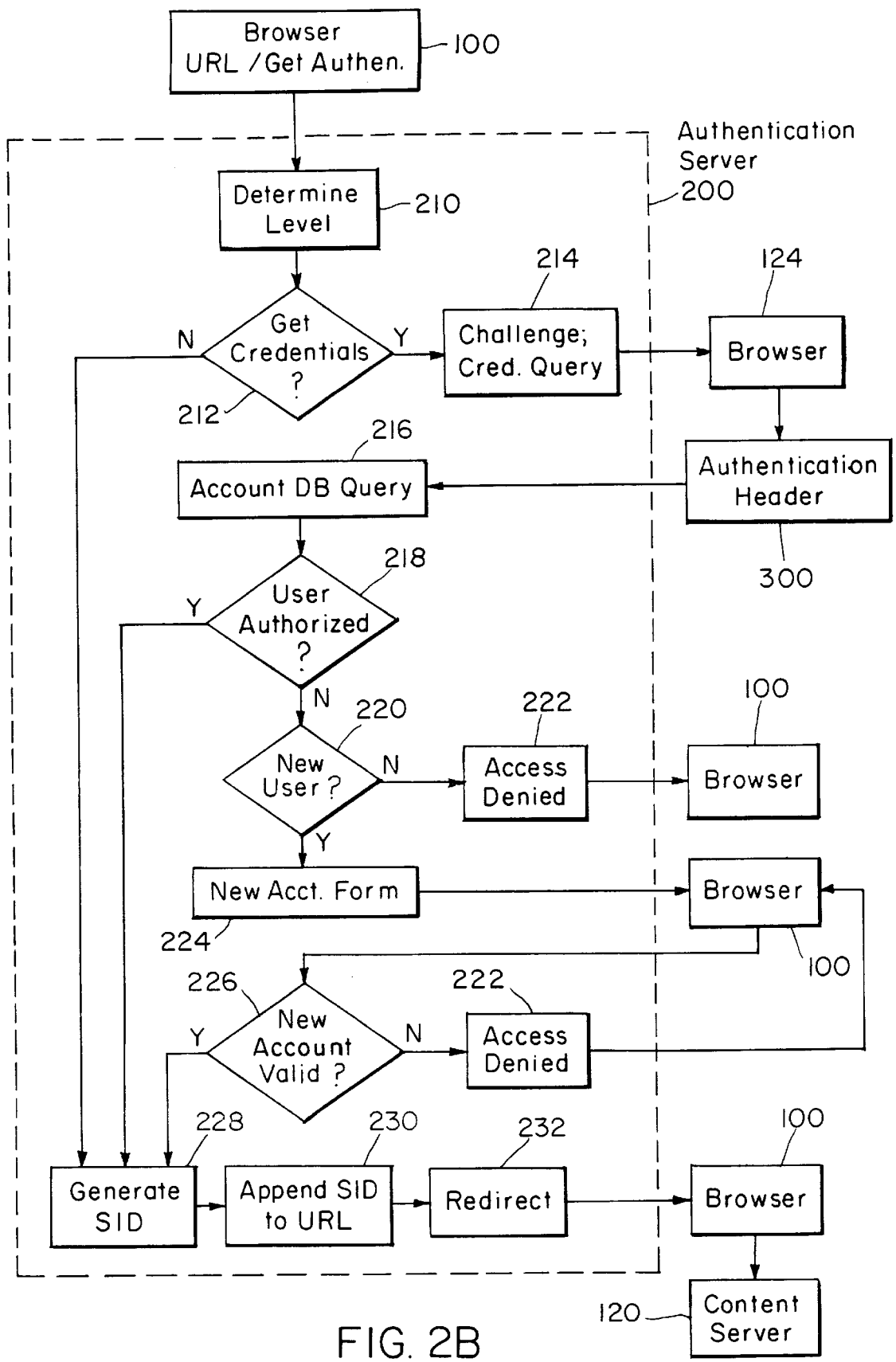
FIG. 2B is a related flowchart describing the details of the authentication process.

FIG. 2B describes the details of the authentication process. The content server may redirect the client to an authentication server. The REDIRECT URL might be: "http://auth.com/authenticate?domain=[domain]&URL= http://content.com/report". That URL requests authentication and specifies the domain and the initial URL. In response to the REDIRECT, the client browser automatically sends a GET request with the provided URL.

Whenever the content server redirects the client to the authentication server 200, the authentication server initiates the authorization process by validating that it is for an approved content server and determining the level of authentication required for the access requested 210. Depending on this level, the server may challenge the user 212 for credentials. If the request is for a low level document, the authentication may issue an appropriate SID immediately 228 and forego the credential check procedures. If the document requires credentials, the authentication server sends a "CHALLENGE" response which causes the client browser to prompt the user for credentials 214. A preferred credential query typically consists of a request for user name and password. If the user is unable to provide a password, the access is denied. The browser forms an authorization header 300 from the information provided, and resends a GET request to the authentication server using the last URL along with an authorization header. For example, a URL of such a GET request may be: "http://auth.com/ authenticate?domain=[domain]&URL=http://content.com/ report and the authorization header may be: "AUTHORIZE: [authorization]".

Upon receiving the GET request, the authentication server queries an account database 216 to determine whether the user is authorized 218 to access the requested document. A preferred account database may contain a user profile which includes information for identifying purposes, such as client IP address and password, as well as user demographic information, such as user age, home address, hobby, or occupation, for later use by the content server. If the user is authorized, an SID is generated 228 as previously described. If the user is not cleared for authorization, the authentication server checks to see if the user qualifies for a new account 220. If the user is not qualified to open a new account, a page denying access 222 is transmitted to the client browser 100. If the user is qualified, the new user is sent a form page such as illustrated in FIG. 5 to initiate a real-time on-line registration 224. The form may, for example, require personal information and credit references from the user. The browser is able to transmit the data entered by the user in the blanks 502 as a "POST" message to the authentication server. A POST message causes form contents to be sent to the server in a data body other than as part of the URL. If the registration form filled out by the new user is valid 226, an appropriate SID is generated 228. If the registration is not valid, access is again denied 222.

An SID for an authorized user is appended ("tagged") 230 to the original URL directed to a controlled page on the content server. The authentication server then transmits a REDIRECT response 232 based on the tagged URL to the client browser 100. The modified URL, such as "http:// content.com/[SID]/report" is automatically forwarded to the content server 120.

Figure 3:
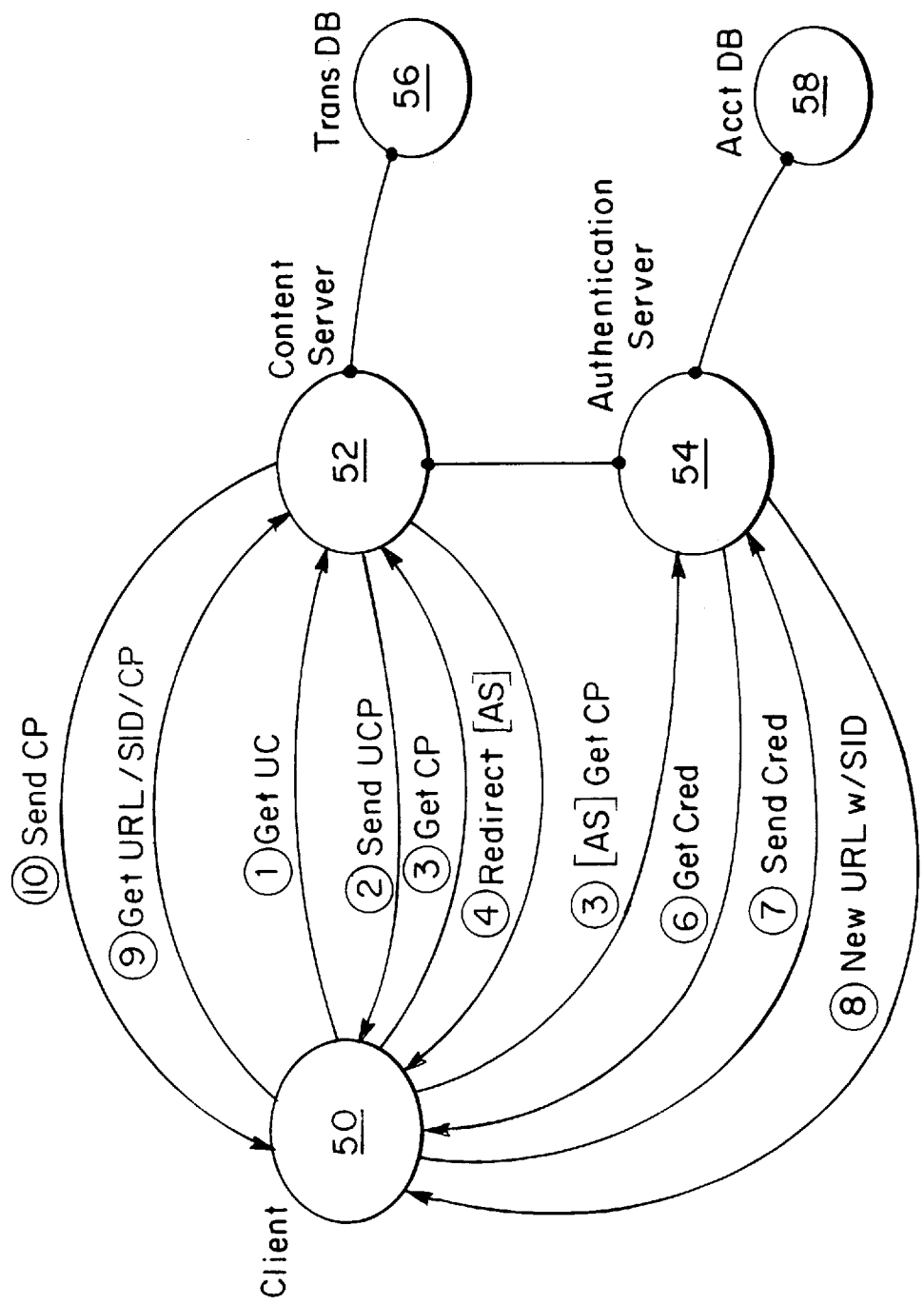
FIG. 3 illustrates an example of a client-server exchange session involving the access control and monitoring method of the present invention.

FIG. 3, illustrates a typical client-server exchange involving the access control and monitoring method of the present invention. In Step 1, the client 50 running a browser transmits a GET request through a network for an uncontrolled page (UCP). For example, the user may request an advertisement page by transmitting a URL "http://content.com/ advertisement", where "content.com" is the server name and "advertisement" is the uncontrolled page name. In Step 2, the content server 52 processes the GET request and transmits the requested page, "advertisement". The content server also logs the GET request in the transaction database 56 by recording the URL, the client IP address, and the current time.

In Step 3, the user on the client machine may elect to traverse a link in the advertisement page directed to a controlled page (CP). For example, the advertisement page may contain a link to a controlled page called "report". Selecting this link causes the client browser 50 to forward a GET request through a URL which is associated with the report file "http://content.com/report". The content server 52 determines that the request is to a controlled page and that the URL does not contain an SID. In Step 4, the content server transmits a REDIRECT response to the client, and, in Step 5, the browser automatically sends the REDIRECT URL to the authentication server 54. The REDIRECT URL sent to the authentication server may contain the following string:

"http://auth.com/authenticate?domain=[domain]&URL= http://content.com/report"

The authentication server processes the REDIRECT and determines whether user credentials (CRED) are needed for authorization. In Step 6, the authentication server transmits a "CHALLENGE" response to the client. As previously described, typical credentials consist of user name and password. An authorization header based on the credential information is then forwarded by the client browser to the authentication server. For example, a GET URL having such an authorization header is: "http://autho.com/ authenticate?domain=[domain]&URL=http://content.com/ report and the authorization header may be: "AUTHORIZE: [authorization]". The authentication server processes the GET request by checking the Account Database 58. If a valid account exists for the user, an SID is issued which authorizes access to the controlled page "report" and all the other pages within the domain.

As previously described, the preferred SID comprises a compact ASCII string that encodes a user identifier, the current domain, a key identifier, an expiration time, the client IP address, and an unforgivable digital signature. In Step 8, the authentication server redirects the client to the tagged URL, "http://content.com/[SID]/report", to the client. In Step 9, the tagged URL is automatically forwarded by the browser as a GET request to the content server. The content server logs the GET request in the Transaction database 56 by recording the tagged URL, the client IP address, and the current time. In Step 10, the content server, upon validating the SID, transmits the requested controlled page "report" for display on the client browser.

According to one aspect of the present invention, the content server periodically evaluates the record contained in the transaction log 56 to determine the frequency and duration of accesses to the associated content server. The server counts requests to particular pages exclusive of repeated requests from a common client in order to determine the merits of the information on different pages for ratings purposes. By excluding repeated calls, the system avoids distortions by users attempting to "stuff the ballot box." In one embodiment, the time intervals between repeated requests by a common client are measured to exclude those requests falling within a defined period of time.

Additionally, the server may, at any given time, track access history within a client-server session. Such a history profile informs the service provider about link transversal frequencies and link paths followed by users. This profile is produced by filtering transaction logs from one or more servers to select only transactions involving a particular user ID (UID). Two subsequent entries, A and B, corresponding to requests from a given user in these logs represent a link traversal from document A to document B made by the user in question. This information may be used to identify the most popular links to a specific page and to suggest where to insert new links to provide more direct access. In another embodiment, the access history is evaluated to determine traversed links leading to a purchase of a product made within commercial pages. This information may be used, for example, to charge for advertising based on the number of link traversals from an advertising page to a product page or based on the count of purchases resulting from a path including the advertisement. In this embodiment, the server can gauge the effectiveness of advertising by measuring the number of sales that resulted from a particular page, link, or path of links. The system can be configured to charge the merchant for an advertising page based on the number of sales that resulted from that page.

According to another aspect of the present invention, a secondary server, such as the authentication server 200 in FIG. 2B, may access a prearranged user profile from the account database 216 and include information based on such a profile in the user identifier field of the SID. In a preferred embodiment, the content server may use such an SID to customize user requested pages to include personalized content based on the user identifier field of the SID.

In another aspect of the invention, the user may gain access to domain of servers containing journals or publications through a subscription. In such a situation, the user may purchase the subscription in advance to gain access to on-line documents through the Internet. The user gains access to a subscribed document over the Internet through the authorization procedure described where an authorization indicator is preferably embedded in a session identifier. In another embodiment, rather than relying on a prepaid subscription, a user may be charged and billed each time he or she accesses a particular document through the Internet. In that case, authorization may not be required so long as the user is fully identified in order to be charged for the service. The user identification is most appropriately embedded in the session identifier described above.

Figure 6:
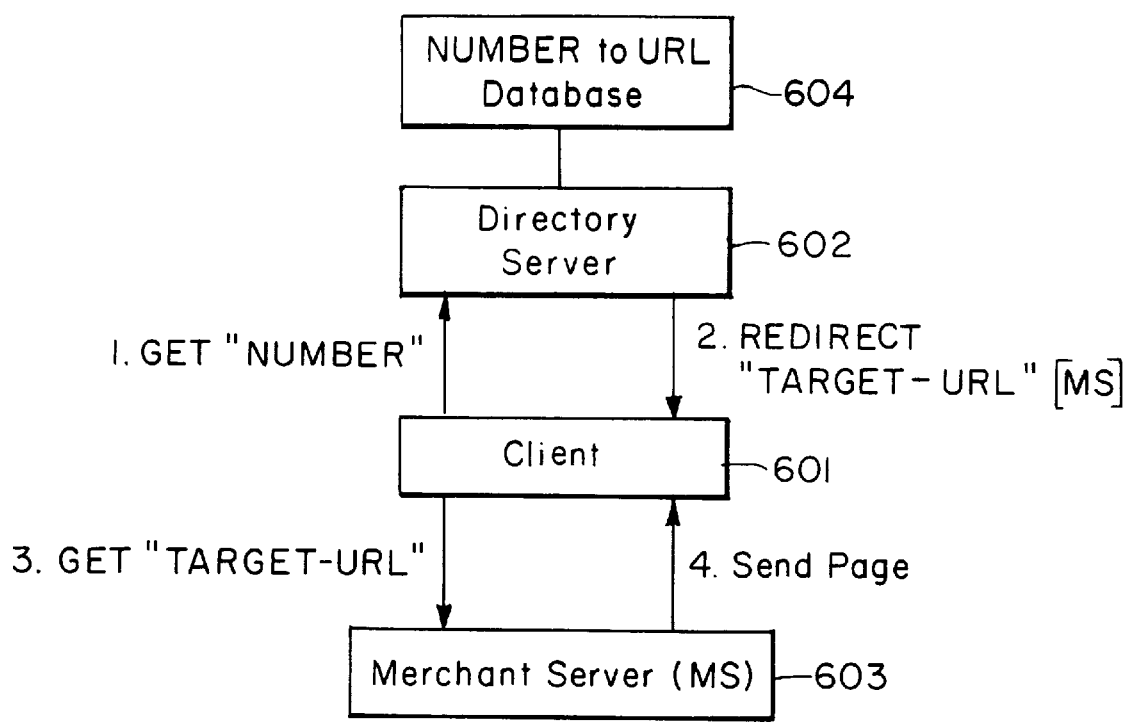
FIG. 6 is a diagram describing the details of the translation of telephone numbers to URLs.

In another aspect of the invention, facilities are provided to allow users to utilize conventional telephone numbers or other identifiers to access merchant services. These merchant services can optionally be protected using SIDs. In a preferred embodiment, as shown in FIG. 6, a Web browser client 601 provides a "dial" command to accept a telephone number from a user, as by clicking on a "dial" icon and inputting the telephone number through the keyboard. The browser then constructs a URL of the form "http:// directory.net/NUMBER", where NUMBER is the telephone number or other identifier specified by the user. The browser then performs a GET of the document specified by this URL, and contacts directory server 602, sending the NUMBER requested in Message 1.

In another embodiment, implemented with a conventional browser, client 601 uses a form page provided by directory server 602 that prompts for a telephone number or other identifier in place of a "dial" command, and Message 1 is a POST message to a URL specified by this form page.

Once NUMBER is received by directory server 602, the directory server uses database 604 to translate the NUMBER to a target URL that describes the merchant server and document that implements the service corresponding to NUMBER. This translation can ignore the punctuation of the number, therefore embedded parenthesis or dashes are not significant. In another embodiment an identifier other than a number may be provided. For example, a user may enter a company name or product name without exact spelling. In such a case a "soundex" or other phonetic mapping can be used to permit words that sound alike to map to the same target URL. Multiple identifiers can also be used, such as a telephone number in conjunction with a product name or extension.

In Message 2, Directory server 602 sends a REDIRECT to client 601, specifying the target URL for NUMBER as computed from database 604. The client browser 601 then automatically sends Message 3 to GET the contents of this URL. Merchant server 603 returns this information in Message 4. The server 602 might have returned a Web page to the client to provide an appropriate link to the required document. However, because server 602 makes a translation to a final URL and sends a REDIRECT rather than a page to client 601, the document of message 4 is obtained without any user action beyond the initial dial input.

The Target URL contained in Message 3 can be an ordinary URL to an uncontrolled page, or it can be a URL that describes a controlled page. If the Target URL describes a controlled page then authentication is performed as previously described. The Target URL can also describe a URL that includes an SID that provides a preauthorized means of accessing a controlled page.

Among benefits of the "dial" command and its implementation is an improved way of accessing the Internet that is compatible with conventional telephone numbers and other identifiers. Merchants do not need to alter their print or television advertising to provide an Internet specific form of contact information, and users do not need to learn about URLs.

In the approach a single merchant server can provide multiple services that correspond to different external "telephone numbers" or other identifiers. For example, if users dial the "flight arrival" number they could be directed to the URL for the arrival page, while, if they dial the "reservations" number, they would be directed to the URL for the reservations page. A "priority gold" number could be directed to a controlled page URL that would first authenticate the user as belonging to the gold users group, and then would provide access to the "priority gold" page. An unpublished "ambassador" number could be directed to a tagged URL that permits access to the "priority gold" page without user authentication.

The source code listing of the preferred embodiment of present invention appears in U.S. Pat. No. 5,708,780, issued Jan. 13, 1998 to Levergood et al, which is incorporated herein by reference. This invention has particular application to network sales systems such as presented in U.S. patent application Ser. No. 08/328,133, filed Oct. 24, 1994, by Payne et al. which is incorporated herein by reference.

Equivalents

Those skilled in the art will know, or be able to ascertain using no more than routine experimentation, many equivalents to the specific embodiments or the invention described herein. These and all other equivalents are intended to be encompassed by the following claims.

What is claimed is:

1. A method of providing a client access to information pages in a server system through a network comprising:

provoding a descriptor comprising a telephone number at the client;

mapping the descriptor to a uniform resource locator using a translation database residing in the server system;

returning the uniform resource locator in a REDIRECT command to the client to request the information using the uniform resource locator; and displaying a page identified by the uniform resource locator at the client.

2. A method as claimed in claim 1 wherein the uniform resource locator describes a controlled page.

* * * * *